United States Patent
Hayashi

(10) Patent No.: US 10,909,063 B2
(45) Date of Patent: Feb. 2, 2021

(54) COMMUNICATION SYSTEM AND TRANSMITTING DEVICE

(71) Applicant: FANUC CORPORATION, Yamanashi (JP)

(72) Inventor: Takurou Hayashi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/587,493

(22) Filed: Sep. 30, 2019

(65) Prior Publication Data

US 2020/0104274 A1 Apr. 2, 2020

(30) Foreign Application Priority Data

Oct. 1, 2018 (JP) .................................. 2018-186311

(51) Int. Cl.
| | | |
|---|---|---|
| G06F 13/42 | (2006.01) | |
| H04L 25/14 | (2006.01) | |
| H04L 7/033 | (2006.01) | |
| H04L 7/00 | (2006.01) | |

(52) U.S. Cl.
CPC ........ *G06F 13/4291* (2013.01); *H04L 7/0008* (2013.01); *H04L 7/033* (2013.01); *H04L 25/14* (2013.01)

(58) Field of Classification Search
CPC ... H04J 3/0667; H04J 3/0682; G06F 13/4291; H04L 25/14
See application file for complete search history.

(56) References Cited

U.S. PATENT DOCUMENTS

| | | | | |
|---|---|---|---|---|
| 8,913,632 B2* | 12/2014 | Aweya | .................. | H03L 7/0994 |
| | | | | 370/503 |
| 8,923,367 B2* | 12/2014 | Okuda | .................. | H04J 3/0667 |
| | | | | 370/469 |
| 9,595,308 B1* | 3/2017 | Wallichs | .................. | G11C 7/10 |
| 9,774,413 B2* | 9/2017 | Takahashi | ............. | H04J 3/0667 |
| 10,309,804 B2* | 6/2019 | Kikuchi | ............. | G01D 5/24495 |

(Continued)

FOREIGN PATENT DOCUMENTS

| | | |
|---|---|---|
| JP | H01191539 A | 8/1989 |
| JP | 200480132 A | 3/2004 |

(Continued)

OTHER PUBLICATIONS

English Abstract and Machine Translation for Japanese Publication No. 2004-080132 A, published Mar. 11, 2004, 3 pgs.

(Continued)

*Primary Examiner* — Brian T Misiura
(74) *Attorney, Agent, or Firm* — Fredrikson & Byron, P.A.

(57) ABSTRACT

In a communication system for performing serial communication between a transmitting device and a receiving device, the transmitting device transmits, to the receiving device, a first data signal including at least information on a transmission clock in one frame, and transmits, to the receiving device, a second data signal including at least information on the transmission clock in one frame, during a time period from transmission of the first data signal until transmission of the first data signal in the next transmission cycle. The receiving device receives the first data signal and the second data signal transmitted from the transmitting device.

8 Claims, 14 Drawing Sheets

(56) References Cited

U.S. PATENT DOCUMENTS

| | | | |
|---|---|---|---|
| 10,374,736 B2* | 8/2019 | Hoshino | G06F 13/4291 |
| 10,505,651 B1* | 12/2019 | Garrett | H04L 63/0428 |
| 2012/0148248 A1* | 6/2012 | Li | H04J 3/065 |
| | | | 398/58 |
| 2015/0163003 A1* | 6/2015 | Takahashi | H04J 3/0667 |
| | | | 370/509 |
| 2020/0052728 A1* | 2/2020 | Hayashi | G05B 19/402 |

FOREIGN PATENT DOCUMENTS

| | | |
|---|---|---|
| JP | 2004080688 A | 3/2004 |
| WO | 2012035629 A1 | 3/2012 |

OTHER PUBLICATIONS

English Abstract and Machine Translation for Japanese Publication No. JPH01-191539A, published Aug. 1, 1989, 4 pgs.
English Abstract and Machine Translation for Japanese Publication No. JP2004-080688A, published Mar. 11, 2004, 10 pgs.
English Abstract and Machine Translation for International Publication No. WO2012-035629A1, published Mar. 22, 2012, 37 pgs.

* cited by examiner

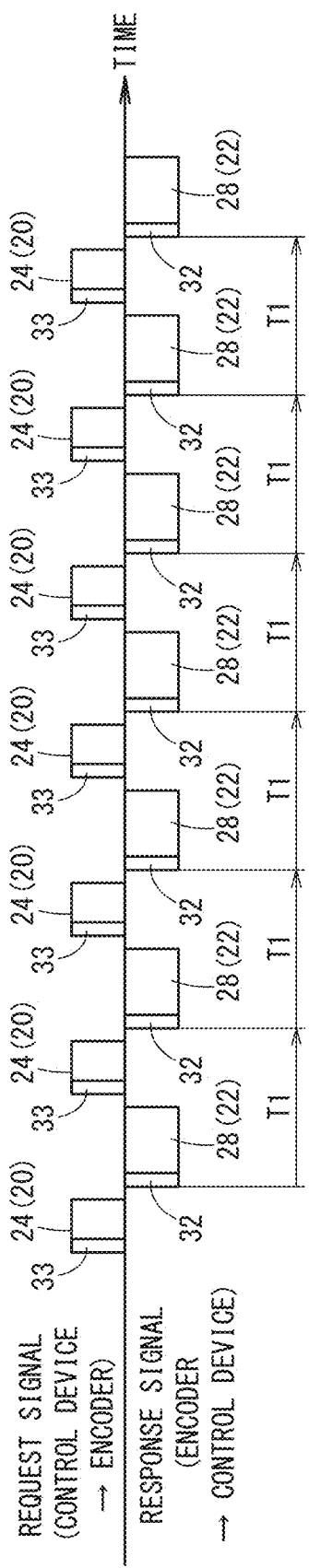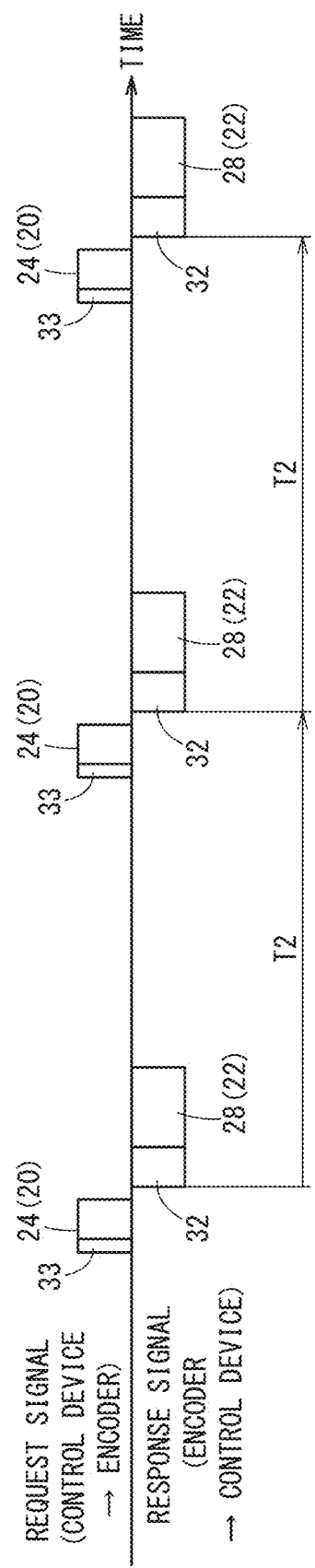

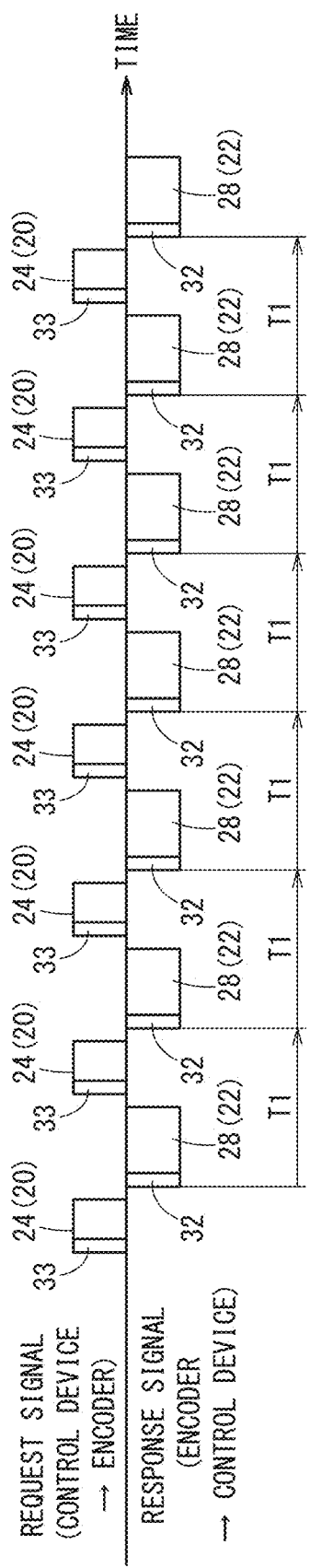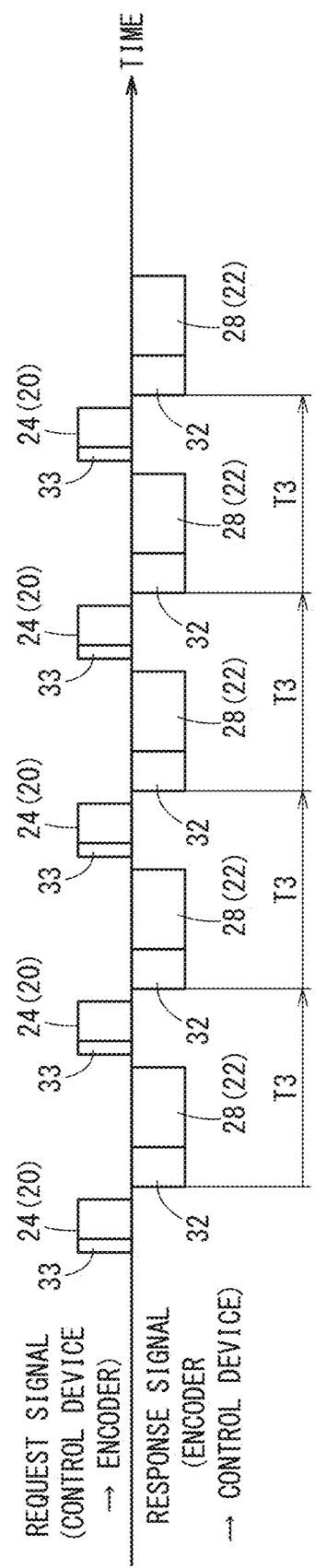

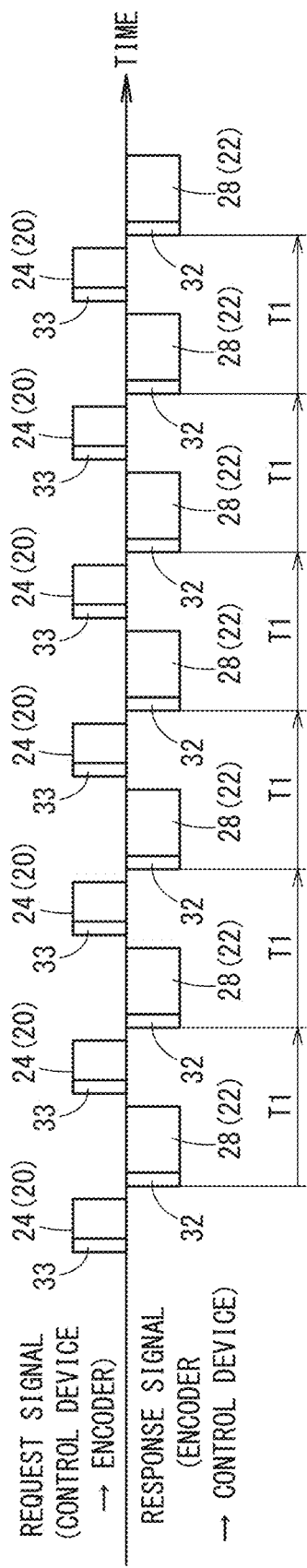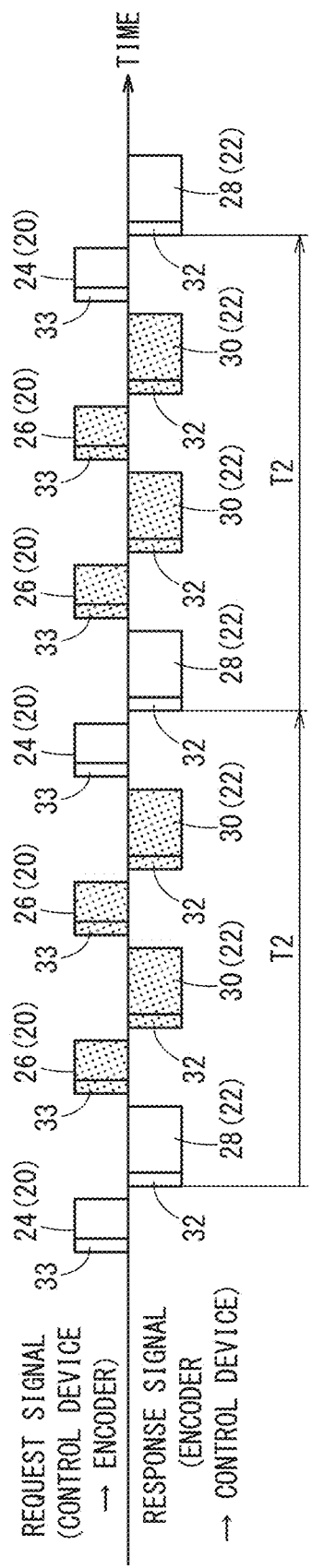

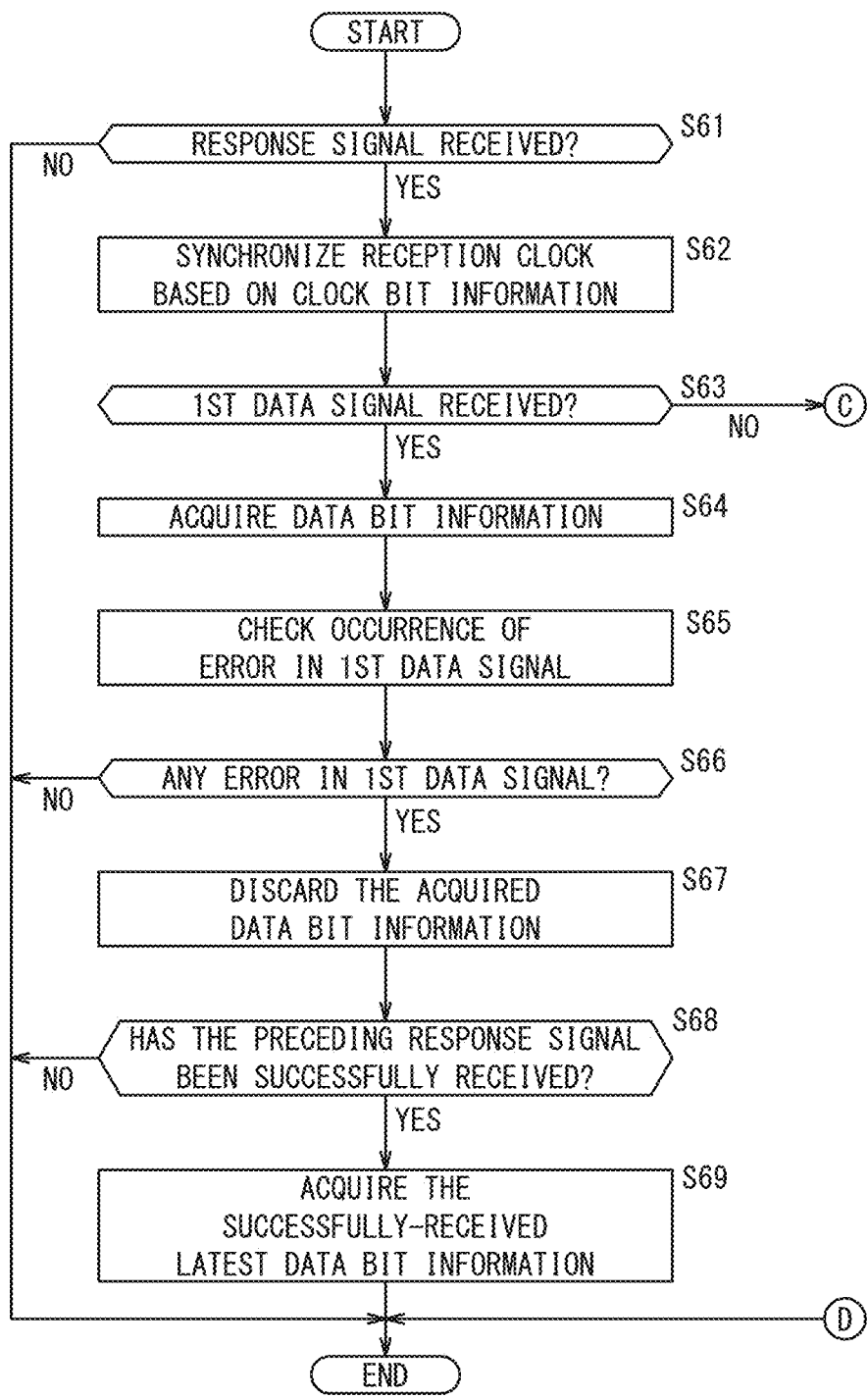

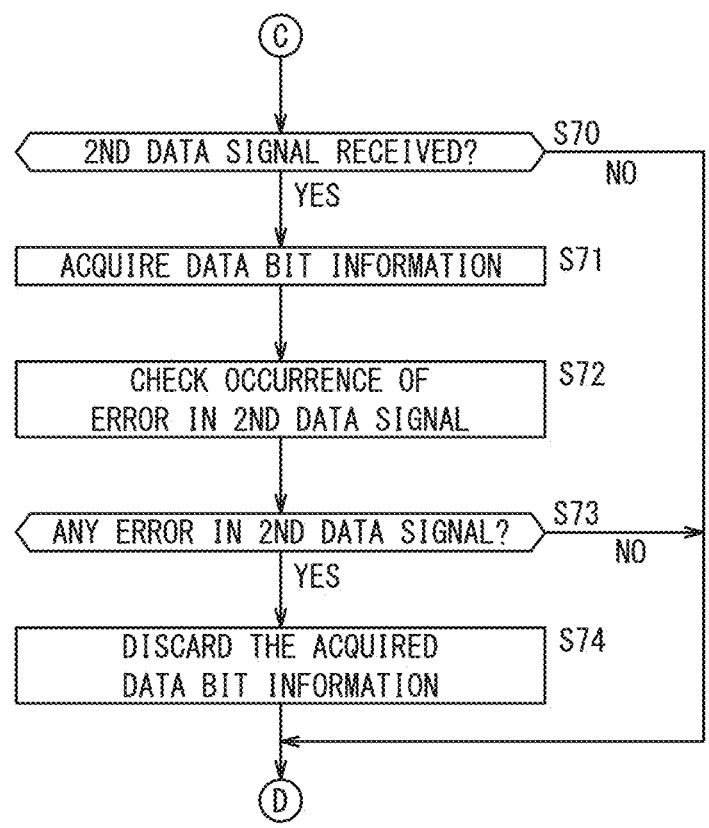

COMMUNICATION SYSTEM AND TRANSMITTING DEVICE

CROSS-REFERENCE TO RELATED APPLICATION

This application is based upon and claims the benefit of priority from Japanese Patent Application No. 2018-186311 filed on Oct. 1, 2018, the contents of which are incorporated herein by reference.

BACKGROUND OF THE INVENTION

Field of the Invention

The present invention relates to a communication system, a transmitting device, a receiving device, a communication method, a transmitting method and a receiving method, for performing serial communication.

Description of the Related Art

Japanese Laid-Open Patent Publication No. 2004-080132 discloses a system that performs serial communication between a master and a slave, in which the master side transmits count data for synchronous detection to the slave side while the slave side detects update timing from the count data to thereby establish synchronization in communication with the master.

SUMMARY OF THE INVENTION

As the communication period becomes longer, the phase difference between the transmission clock on the transmission side and the reception clock on the reception side becomes greater. In the technique of Japanese Laid-Open Patent Publication No. 2004-080132, when the communication period becomes longer, there is a possibility that the slave cannot establish communication synchronization with the master even if the slave receives count data.

The present invention has been devised to solve the above problem, and it is therefore an object of the present invention to provide a communication system, a transmitting device, a receiving device, a communication method, a transmitting method and a receiving method, which enable the reception clock on the receiving device to be synchronized with the transmission clock on the transmitting device, regardless of the communication period in serial communication.

A first aspect of the present invention resides in a communication system configured to perform serial communication between a transmitting device and a receiving device, wherein: the transmitting device is configured to transmit, to the receiving device, a first data signal including at least information on a transmission clock in one frame, and transmit, to the receiving device, a second data signal including at least information on the transmission clock in one frame, during a time period from transmission of the first data signal until transmission of the first data signal in the next transmission cycle; and the receiving device is configured to receive the first data signal and the second data signal transmitted from the transmitting device, and synchronize a reception clock thereof with the transmission clock based on the information on the transmission clock of the first data signal and the information on the transmission clock of the second data signal.

A second aspect of the present invention resides in a transmitting device configured to perform serial communication with a receiving device, wherein the transmitting device is configured to transmit, to the receiving device, a first data signal including at least information on a transmission clock in one frame, and transmit, to the receiving device, a second data signal including at least information on the transmission clock in one frame, during a time period from transmission of the first data signal until transmission of the first data signal in the next transmission cycle.

A third aspect of the present invention resides in a receiving device configured to perform serial communication with a transmitting device, wherein the receiving device is configured to receive a first data signal transmitted from the transmitting device, the first data signal including at least information on a transmission clock in one frame, and receive a second data signal transmitted from the transmitting device, during a time period from transmission of the first data signal until transmission of the first data signal in the next transmission cycle, the second data signal including at least information on the transmission clock in one frame, and the receiving device is further configured to synchronize a reception clock thereof with the transmission clock based on the information on the transmission clock of the first data signal and the information on the transmission clock of the second data signal.

A fourth aspect of the present invention resides in a communication method for performing serial communication between a transmitting device and a receiving device. The method includes the steps of: with the transmitting device, transmitting, to the receiving device, a first data signal including at least information on a transmission clock in one frame, and transmitting, to the receiving device, a second data signal including at least information on the transmission clock in one frame, during a time period from transmission of the first data signal until transmission of the first data signal in the next transmission cycle; and with the receiving device, receiving the first data signal and the second data signal transmitted from the transmitting device, and synchronizing a reception clock thereof with the transmission clock based on the information on the transmission clock of the first data signal and the information on the transmission clock of the second data signal.

A fifth aspect of the present invention resides in a signal transmitting method in a transmitting device performing serial communication with a receiving device, which includes a step of: transmitting, to the receiving device, a first data signal including at least information on a transmission clock in one frame, and transmitting, to the receiving device, a second data signal including at least information on the transmission clock in one frame, during a time period from transmission of the first data signal until transmission of the first data signal in the next transmission cycle.

A sixth aspect of the present invention resides in a signal receiving method in a receiving device performing serial communication with a transmitting device, which includes the steps of: receiving a first data signal transmitted from the transmitting device, the first data signal including at least information on a transmission clock in one frame, and receiving a second data signal transmitted from the transmitting device, during a time period from transmission of the first data signal until transmission of the first data signal in the next transmission cycle, the second data signal including at least information on the transmission clock in one frame; and synchronizing a reception clock thereof with the transmission clock based on the information on the transmission clock of the first data signal and the information on the transmission clock of the second data signal.

According to the present invention, in serial communication, the reception clock of the reception device can be synchronized with the transmission clock of the transmission device, regardless of the communication period.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7A is a timing chart showing a case where the transmission period of a first data signal from an encoder to a control device is short (period T1), and FIG. 7B is a timing chart showing a case where the transmission period of a first data signal from the encoder to the control device is long (period T2);

FIG. 8A is a timing chart in which the transmission period of a first data signal from an encoder to a control device is set shortest (period T1) when the clock bit field is set short, and FIG. 8B is a timing chart in which the transmission period of a first data signal from an encoder to a control device is set shortest (period T3) when the clock bit field is set long;

FIG. 9A is a timing chart when the transmission period of a first data signal from an encoder to a control device is short (period T1), and FIG. 9B is a timing chart when the transmission period of a first data signal from an encoder to a control device is long (period T2);

FIG. 13 is a flowchart showing a reception processing flow of a response signal performed in a control device; and FIG. 14 is a flowchart showing a reception processing flow of a response signal performed in a control device.

DESCRIPTION OF THE PREFERRED EMBODIMENTS

First Embodiment

[Configuration of Communication System]

Figure 1:
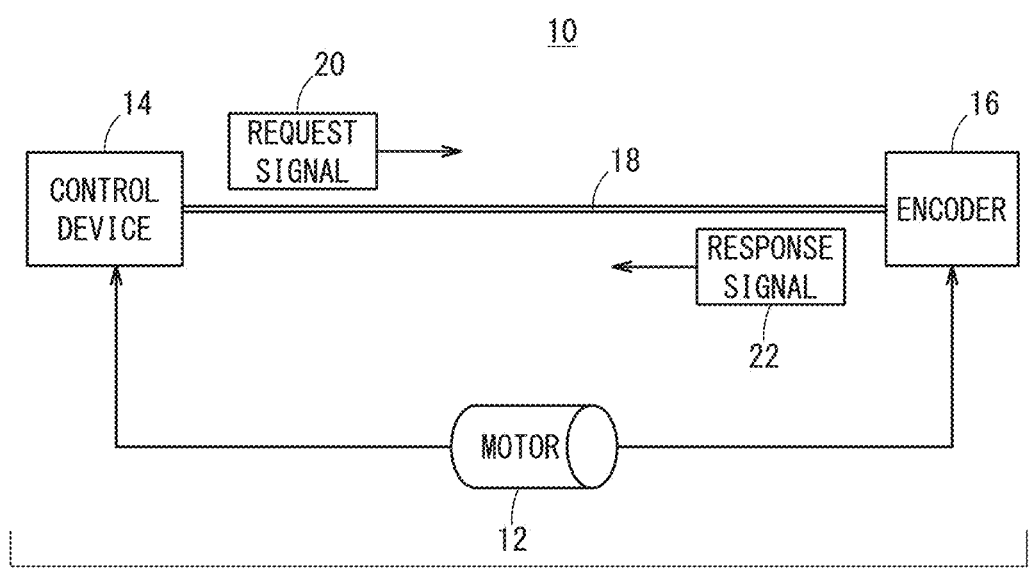
FIG. 1 is a block diagram showing a configuration of a communication system.

FIG. 1 is a block diagram showing a configuration of a communication system 10. The communication system 10 includes a control device 14 controlling a motor 12, and an encoder 16 detecting the rotational position of the motor 12. The control device 14 controls the motor 12 in accordance with the rotational position of the motor 12 detected by the encoder 16. The control device 14 and the encoder 16 are connected by a communication line 18.

The communication system 10 performs serial communication between the control device 14 and the encoder 16. The communication line 18 of the communication system 10 of the present embodiment is formed of a single channel, and the communication system 10 performs half-duplex communication that uses one line for transmitting signals from both the control device 14 and the encoder 16. Moreover, the transmission system of the communication system 10 uses single ended transmission.

The control device 14 transmits a request signal 20 to the encoder 16 via the communication line 18. When the encoder 16 receives the request signal 20 transmitted from the control device 14, the encoder 16 returns a response signal 22 to the control device 14 via the communication line 18. There are two types of request signals 20, a first data request signal 24 and a second data request signal 26. There are two types of response signals 22, a first data signal 28 and a second data signal 30 (FIG. 2).

Figure 2:
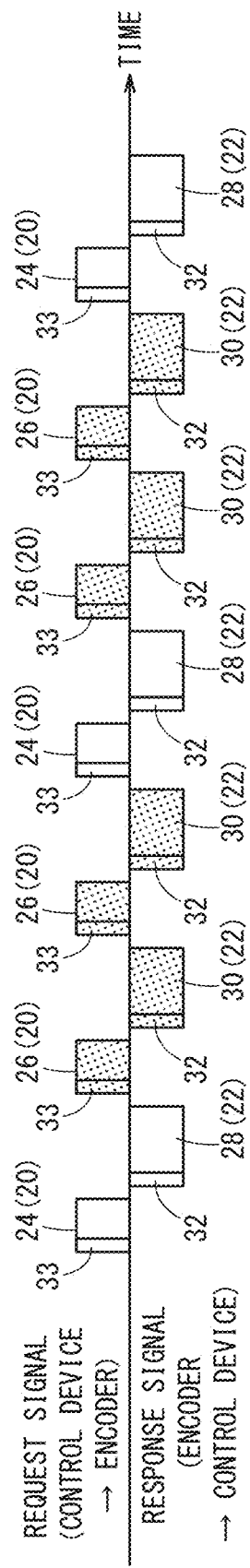
FIG. 2 is a timing chart showing transmission timings of request signals sent from a control device to an encoder and transmission timings of response signals sent from the encoder to the control device.

FIG. 2 is a timing chart showing transmission timings of request signals 20 sent from the control device 14 to the encoder 16 and response signals 22 sent from the encoder 16 to the control device 14. The first data request signal 24 is a signal of the control device 14 for requesting the encoder 16 to return the first data signal 28. The second data request signal 26 is a signal of the control device 14 for requesting the encoder 16 to return the second data signal 30.

The control device 14 transmits the first data request signal 24 to the encoder 16. The encoder 16 that has received the first data request signal 24 returns the first data signal 28 to the control device 14. The control device 14 transmits the second data request signal 26 to the encoder 16. The encoder 16 that has received the second data request signal 26 returns the second data signal 30 to the control device 14.

Figure 3:
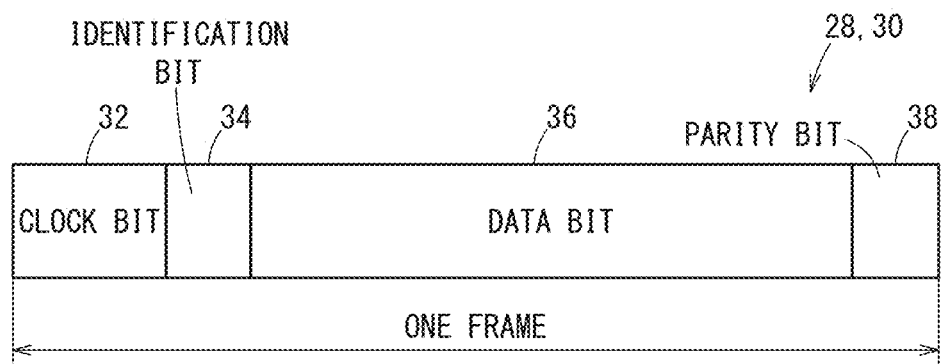
FIG. 3 is a schematic diagram showing the structures of a first data signal and a second data signal.

FIG. 3 is a schematic diagram showing the structures of the first data signal 28 and the second data signal 30. The first data signal 28 and the second data signal 30 each have a clock bit field (clock bits) 32, an identification bit field (identification bits) 34, a data bit field (data bits) 36 and a parity bit field (parity bit) 38 in one frame.

The clock bit field 32 has information on the transmission clock used at the time when the encoder 16 transmits the first data signal 28 and the second data signal 30 to the communication line 18. The clock bit field 32 carries information such as "101010 . . . ", and the control device 14, by monitoring the edge of the information of the clock bit field 32, can synchronize the reception clock of the control device 14 with the transmission clock of the encoder 16. As a result, the control device 14 can receive the information of the identification bit field 34, the data bit field 36 and the parity bit field 38 added after the clock bit field 32 of each of the first data signal 28 and the second data signal 30 at the correct reception timings.

As shown in FIG. 2, the first data request signal 24 and the second data request signal 26 also have the clock bit field 33 in one frame, similarly to the first data signal 28 and the second data signal 30. The clock bit field 33 carries information such as "101010 . . . ", and the encoder 16, by monitoring the edge of the information of the clock bit field 33, can synchronize the reception clock of the encoder 16 with the transmission clock of the control device 14.

The identification bit field 34 gives information on whether the received signal is the first data signal 28 or the second data signal 30. The control device 14 can identify whether the received signal is the first data signal 28 or the second data signal 30 by monitoring the identification bit field 34.

The data bit field 36 has information on the rotational position of the motor 12. The control device 14 generates a control signal for controlling the motor 12 in accordance with the information on the rotational position of the motor 12, included in the data bit field 36. The data bit field 36 of the second data signal 30 may or may not include information on the rotational position of the motor 12. Also, the second data signal 30 may be configured not to have the data bit field 36.

The parity bit field 38 is an error detection code, and the signal is set such that the number of "1"s in one frame becomes odd. When the number of "1"s in one frame of the received first data signal 28 or second data signal 30 is even, the control device 14 determines that the received signal contains an error. The second data signal 30 may be configured not to have the parity bit field 38. Also, instead of the parity bit field 38, other error detection code or error correction code such as CRC or the like may be used.

[Request Signal Transmission Process]

Figure 4:
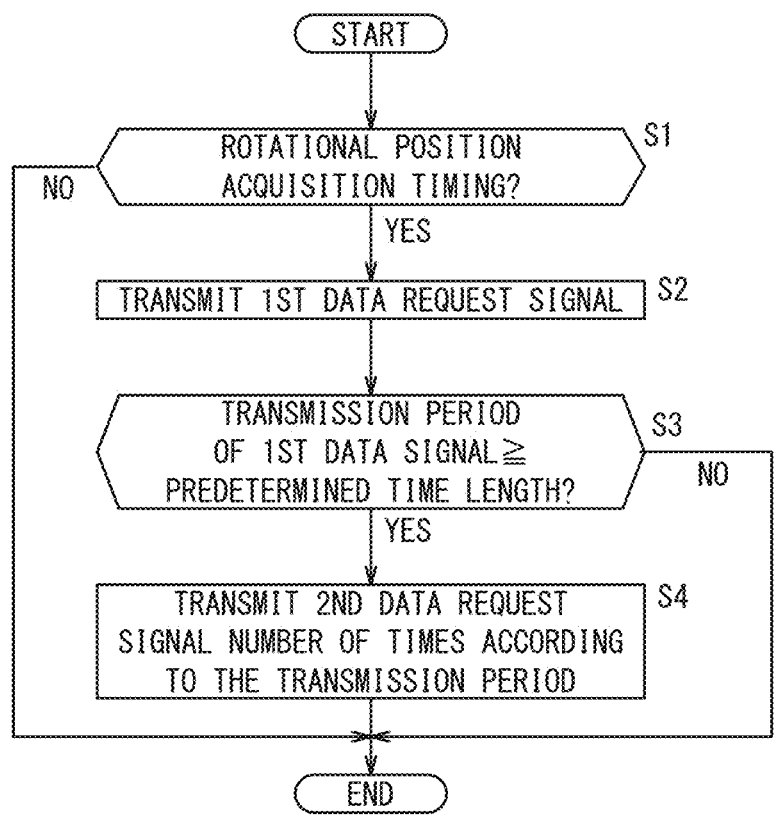
FIG. 4 is a flowchart showing a transmission processing flow of request signals performed in a control device.

FIG. 4 is a flowchart showing a processing flow of transmitting the request signal 20, performed in the control device 14. The transmission process of the request signal 20 is repeated at predetermined time intervals.

At step S1, the control device 14 determines whether it is an acquisition timing of rotational position information of the motor 12. When it is the acquisition timing of the rotational position information, the process proceeds to step S2, and when it is not the acquisition timing, the process is terminated. The acquisition period of acquiring the rotational position information is appropriately designated based on the positional responsiveness required to control the motor 12. For example, when a high positional responsiveness is required to control the motor 12, the acquisition period of rotational position information is set short. When the required positional responsiveness for control of the motor 12 is relatively low, the acquisition period of rotational position information is set long.

At step S2, the control device 14 transmits the first data request signal 24 to the encoder 16.

At step S3, the control device 14 determines whether or not the transmission period of the first data signal 28 transmitted from the encoder 16 is equal to or longer than a predetermined length (whether the transmission period the predetermined time length). If the transmission period is equal to or longer than the predetermined length, the process proceeds to step S4. When the transmission period is less than the predetermined length, the process is terminated. Since the transmission period of the first data signal 28 transmitted from the encoder 16 is determined based on the period of transmitting the first data request signal 24 from the control device 14 to the encoder 16, it is possible to grasp the transmission period of the first data signal 28 on the control device 14 side.

At step S4, the control device 14 transmits the second data request signal 26 the number of times according to the transmission period of the first data signal 28.

[Response Signal Transmission Process]

Figure 5:
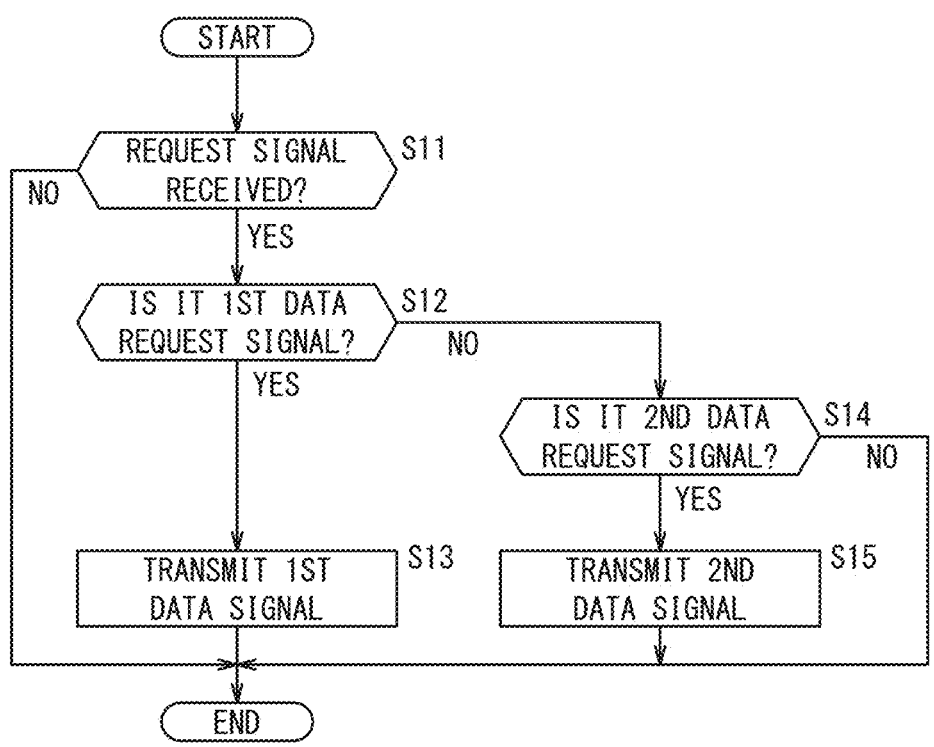
FIG. 5 is a flowchart showing a transmission processing flow of response signals performed in an encoder.

FIG. 5 is a flowchart showing a processing flow of transmitting response signals 22, performed in the encoder 16. The transmission process of response signals 22 is repeated at predetermined time intervals.

At step S11, the encoder 16 determines whether or not a request signal 20 has been received. When a request signal 20 has been received, the process proceeds to step S12. When no request signal 20 is received, the process is terminated.

At step S12, the encoder 16 determines whether or not the received request signal 20 is the first data request signal 24. If the received request signal 20 is the first data request signal 24, the process goes to step S13. If the received request signal 20 is not the first data request signal 24, the process goes to step S14.

At step S13, the encoder 16 transmits the first data signal 28 to the control device 14 and terminates the process.

At step S14 after a negative decision (NO) at step S12, the encoder 16 determines whether or not the received request signal 20 is the second data request signal 26. When the received request signal 20 is the second data request signal 26, the process goes to step S15. When the received request signal 20 is not the second data request signal 26, the process is ended.

At step S15, the encoder 16 transmits the second data signal 30 to the control device 14, and the process is terminated.

[Response Signal Reception Process]

Figure 6:
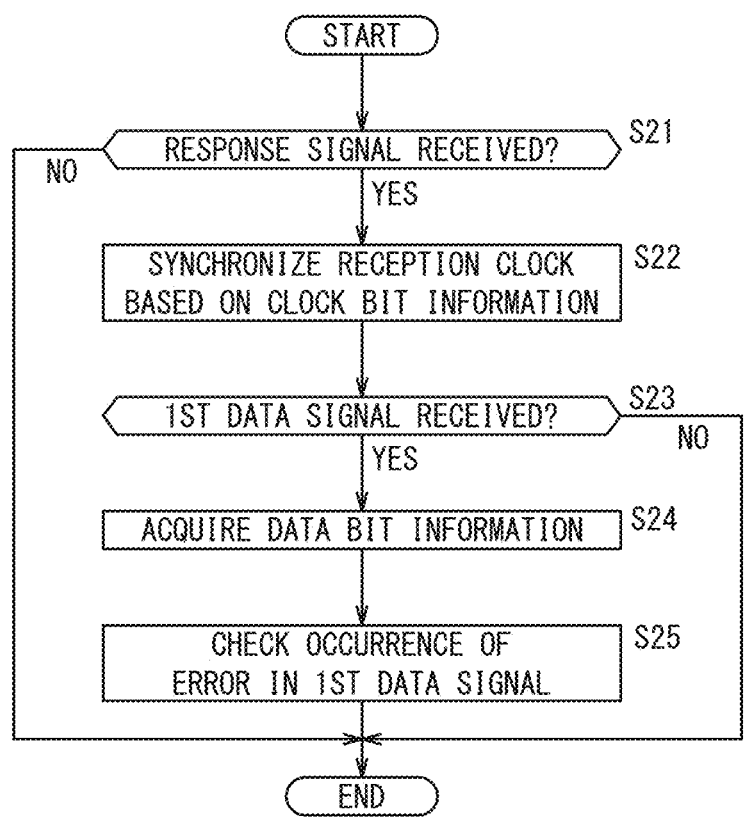
FIG. 6 is a flowchart showing a reception processing flow of a response signal performed in a control device.

FIG. 6 is a flowchart showing a processing flow of receiving a response signal 22 performed in the control device 14. The reception process of a response signal 22 is repeated at predetermined time intervals.

At step S21, the control device 14 determines whether or not a response signal 22 has been received. When the response signal 22 has been received, the process proceeds to step S22. When no response signal 22 is received, the process is terminated.

At step S22, the control device 14 synchronizes the reception clock with the transmission clock based on the information included in the clock bit field 32.

At step S23, the control device 14 determines whether or not the received response signal 22 is the first data signal 28. If the received response signal 22 is the first data signal 28, the process goes to step S24. If the received response signal 22 is not the first data signal 28, the process is terminated.

At step S24, the control device 14 acquires information from the data bit field 36 of the first data signal 28. The control device 14 controls the motor 12 based on the information of the data bit field 36.

At step S25, the control device 14 checks the occurrence of error in the first data signal 28 based on the number of "1"s included in the first data signal 28 inclusive of the parity bit 38, and terminates the process.

[Operation and Effect]

Although the frequency of the transmission clock of the encoder 16 and the frequency of the reception clock of the control device 14 are designed to coincide with each other, a phase difference occurs between the transmission clock and the reception clock because there is a frequency difference between them due to manufacturing error of vibrators and other components. The phase difference between the transmission clock and the reception clock becomes greater as the transmission period of signals from the encoder 16 to the control device 14 becomes longer. Here, the diagrams shown in FIGS. 7A to 8B hereinbelow assume situations in which first data request signals 24 and first data signals 28 are exchanged between the encoder 16 and the control device 14.

FIG. 7A is a timing chart when the transmission period of the first data signal 28 from the encoder 16 to the control device 14 is short (period T1). FIG. 7B is a timing chart when the transmission period of the first data signal 28 from the encoder 16 to the control device 14 is long (period T2).

As the phase difference between the transmission clock and the reception clock is greater, the clock bit field 32 needs to be set longer in order to synchronize the transmission clock with the reception clock (i.e., in order to place the transmission clock in phase with the reception clock). The length of the clock bit field 32 is determined in advance by the communication protocol so that the length of the clock bit field 32 cannot be changed dynamically. When the transmission period of the first data signal 28 is dynamically changed as in the communication system 10 of the present embodiment, it is necessary to set the length of the clock bit field 32 in accordance with the case where the transmission period is long.

FIG. 8A shows a timing chart in the case where the transmission period of the first data signal 28 from the encoder 16 to the control device 14 is made shortest (period T1) when the clock bit field 32 is set short. FIG. 8B shows a timing chart in the case where the transmission period of the first data signal 28 from the encoder 16 to the control device 14 is made shortest (period T3) when the clock bit field 32 is set long.

As the length of the clock bit field 32 is increased, the length of the first data signal 28 in each frame also becomes greater, so that the transmission period cannot be shortened as compared with the case where the length of the clock bit field 32 is short, which results in a decreased transmission rate.

As such, in the present embodiment, the encoder 16 is configured to transmit the second data signal 30 during a time period from the transmission of the first data signal 28 until the transmission of the first data signal 28 in the next period (next cycle).

FIG. 9A is a timing chart when the transmission period of the first data signal 28 from the encoder 16 to the control device 14 is short (period T1). FIG. 9B is a timing chart when the transmission period of the first data signal 28 from the encoder 16 to the control device 14 is long (period T2).

As shown in FIG. 9A, for a case where the transmission period of the first data signal 28 is short, the transmission period of the first data signal 28 can be made short by not allowing transmission of the second data signal 30, so that the transmission rate is increased. On the other hand, for a case where the transmission period of the first data signal 28 is long as shown in FIG. 9B, second data signals 30 are transmitted during the time period from the transmission of the first data signal 28 until the transmission of the first data signal 28 in the next cycle, so that the control device 14 can receive signals having the clock bit field 32 at relatively short intervals. Thus, the reception clock can be synchronized with the transmission clock before the phase difference between the transmission clock and the reception clock becomes large, and hence the length of the clock bit field 32 can be kept short.

Further, this embodiment is configured such that as the transmission period of the first data signal 28 becomes longer, the second data signal 30 is transmitted a greater number of times during the time period from the transmission of the first data signal 28 until the transmission of the first data signal 28 in the next cycle. Thus, even if the transmission period of the first data signal 28 becomes longer, the reception clock of the control device 14 can be synchronized with the transmission clock of the encoder 16.

Second Embodiment

In the present embodiment, the second data signal 30 has a data bit field 36, which carries information on the rotational position of the motor 12. The control device 14 acquires information from the data bit field 36 of the second data signal 30 if the first data signal 28 contains an error.

[Response Signal Reception Process]

Figure 10:
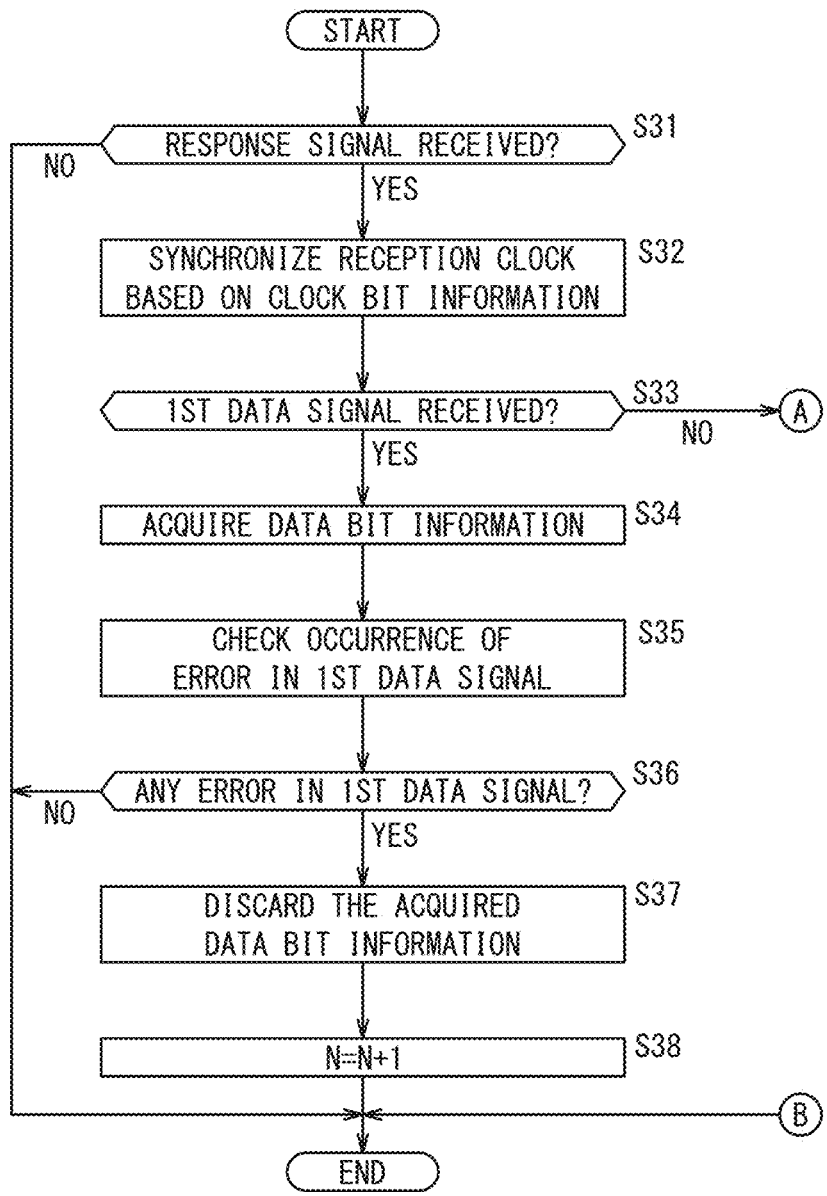
FIG. 10 is a flowchart showing a reception processing flow of a response signal performed in a control device.
Figure 11:
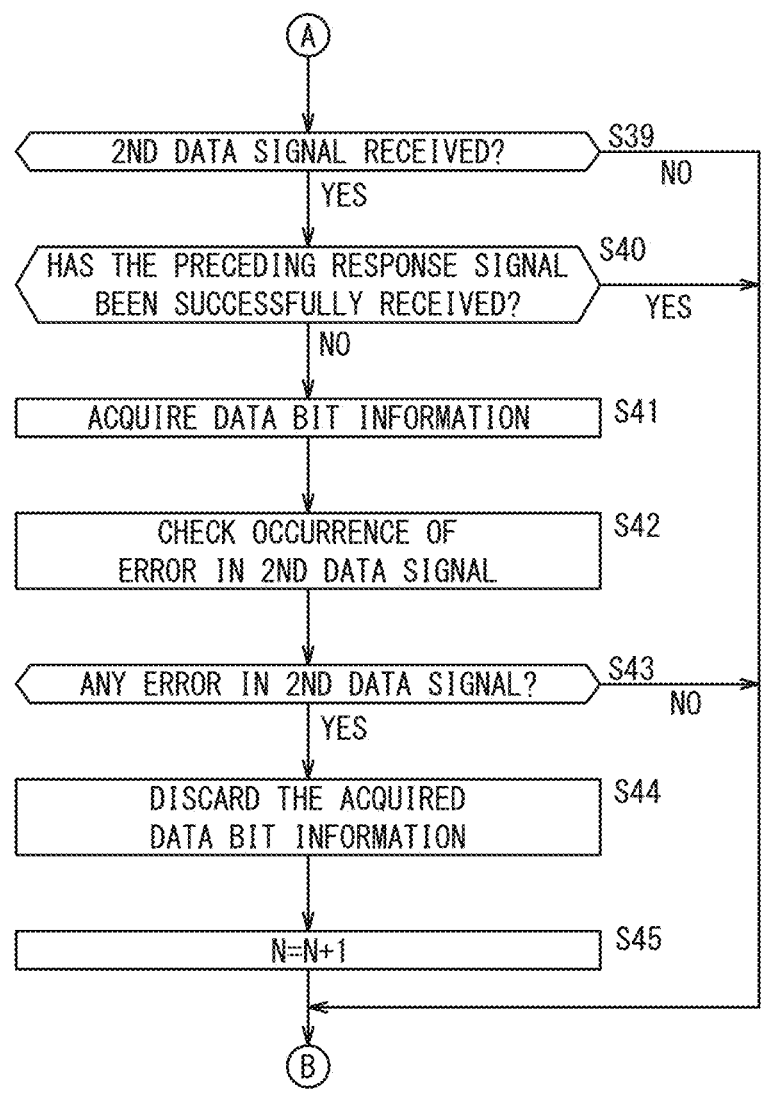
FIG. 11 is a flowchart showing a reception processing flow of a response signal performed in a control device.

FIGS. 10 and 11 are flowcharts showing a processing flow of receiving a response signal 22 performed in the control device 14. The reception process of a response signal 22 is repeated at predetermined time intervals.

At step S31, the control device 14 determines whether or not a response signal 22 has been received. When a response signal 22 has been received, the process proceeds to step S32. When no response signal 22 is received, the process is terminated.

At step S32, the control device 14 synchronizes the reception clock with the transmission clock based on the information of the clock bit field 32.

At step S33, the control device 14 determines whether or not the received response signal 22 is the first data signal 28. If the received response signal 22 is the first data signal 28, the process goes to step S34. If the received response signal 22 is not the first data signal 28, the process proceeds to step S39.

At step S34, the control device 14 acquires information from the data bit field 36 of the first data signal 28. The control device 14 controls the motor 12 based on the information of the data bit field 36.

At step S35, the control device 14 checks the occurrence of error in the first data signal 28 based on the number of "1"s included in the first data signal 28 inclusive of the parity bit 38.

At step S36, the control device 14 determines whether the first data signal 28 includes an error. If there is an error in the first data signal 28, the process goes to step S37. If no error is included in the first data signal 28, the process is terminated.

At step S37, the control device 14 discards the information of the data bit field 36 acquired at step S34, and proceeds to step S38.

At step S38, the control device 14 increments a counter N and ends the process.

At step S39 after a negative decision at step S33, the control device 14 determines whether or not the received response signal 22 is the second data signal 30. When the received response signal 22 is the second data signal 30, the process goes to step S40. When the received signal is not the second data signal 30, the process is terminated.

At step S40, the control device 14 determines whether or not the preceding response signal 22 has been successfully received. If the preceding response signal 22 has been received successfully, the process is ended. When the preceding response signal 22 has not been successfully received, the process goes to step S41. For example, in a case where the second data signal 30 is transmitted twice during one transmission cycle of the first data signal 28, and when the control device 14 has received the second one of the second data signals 30, the preceding response signal 22 refers to the first data signal 28 and the first one of the second data signals 30. Successful reception of a response signal 22 means that at least one of the first data signal 28 and the first one of the second data signals 30 was received while at least one of the received first data signal 28 and the received first one of the second data signals 30 is free from errors.

At step S41, the control device 14 acquires information from the data bit field 36 of the second data signal 30. The control device 14 controls the motor 12 based on the information of the data bit field 36.

At step S42, the control device 14 checks the occurrence of error in the second data signal 30 based on the number of "1"s included in the second data signal 30 inclusive of the parity bit 38.

At step S43, the control device 14 determines whether the second data signal 30 includes an error. When there is an error in the second data signal 30, the process goes to step S44. When no error is included in the second data signal 30, the process is terminated.

At step S44, the control device 14 discards the information of the data bit field 36 acquired at step S41, and proceeds to step S45.

At step S45, the control device 14 increments the counter N and ends the process.

[Motor Control by Control Device]

When having received the first data signal 28 successfully, the control device 14 controls the motor 12 based on the information on the rotational position of the motor 12 included in the data bit field 36 of the first data signal 28. When failing to receive the first data signal 28 successfully, the control device 14 controls the motor 12 based on the information of the data bit field 36 included in the second data signal 30 sent following the first data signal 28. Here, the cases where the control device 14 fails to receive the first data signal 28 successfully include a case where the control device fails to receive the first data signal 28 and a case where the received first data signal 28 contains an error.

[Operation and Effect]

This embodiment is configured such that when the control device 14 fails to receive the first data signal 28 or when the received first data signal 28 includes error, the control device 14 acquires information from the data bit field 36 of the second data signal 30. With this configuration, signal redundancy can be secured, so that it is possible to improve the reliability of the communication system 10.

In the present embodiment, when there is an error in the first data signal 28 or the second data signal 30, the control device 14 counts the number of error events. This makes it possible to determine the communication quality of the communication system 10.

In the case where the first data signal 28 or the second data signal 30 includes error, instead of counting the number of error events, the amount of data may be counted when the control device fails to successfully receive the first data signal 28 or the second data signal 30.

Third Embodiment

In this embodiment, the first data signal 28 and the second data signal 30 have no parity bit 38. Instead, the first data signal 28 and the second data signal 30 are compared with each other to determine whether or not the two data signals 28 and 30 coincide with each other.

[Response Signal Reception Process]

Figure 12:
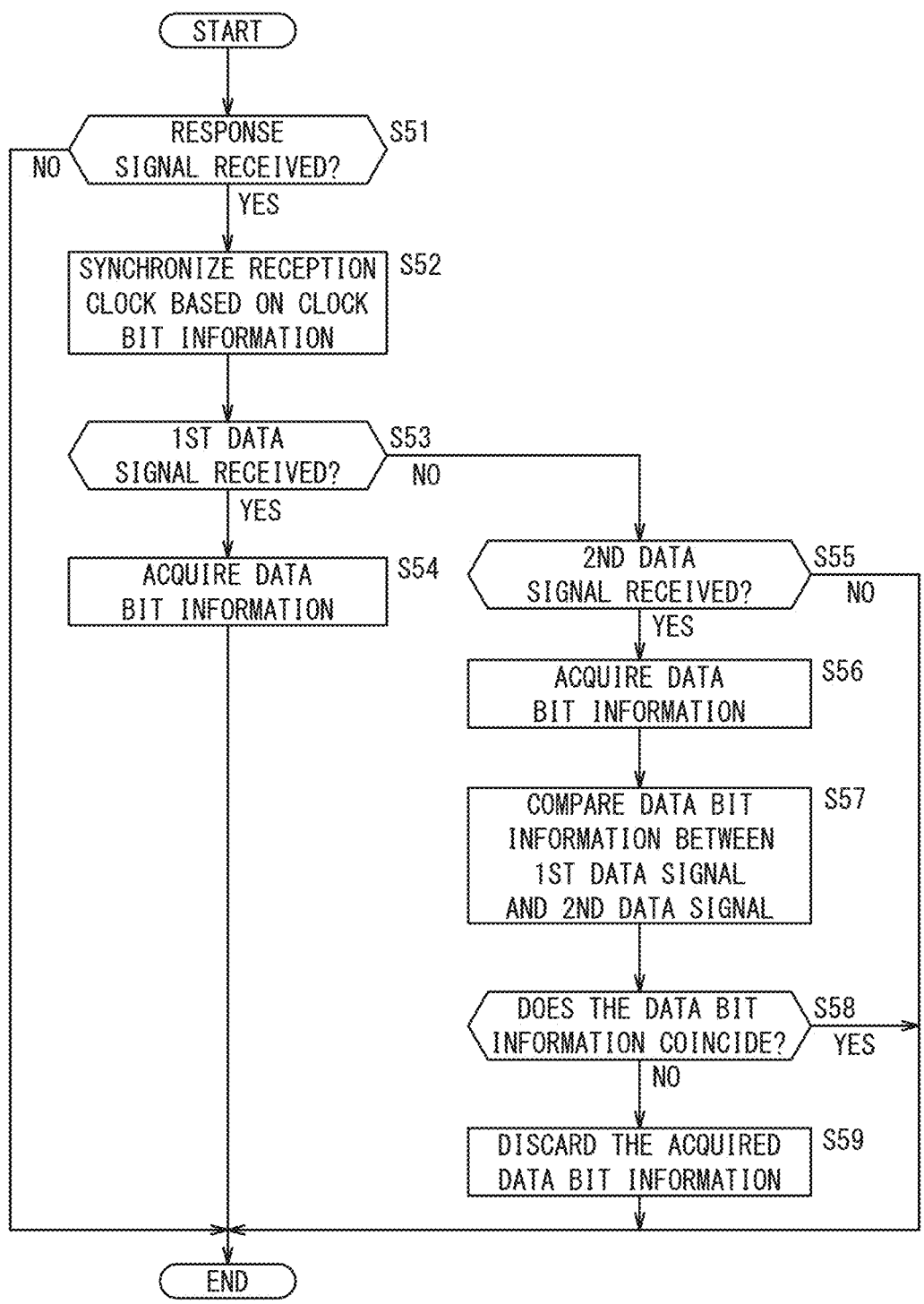
FIG. 12 is a flowchart showing a reception processing flow of a response signal performed in a control device.

FIG. 12 is a flowchart showing a processing flow of receiving a response signal 22 performed in the control device 14. The reception process of a response signal 22 is repeated at predetermined time intervals.

At step S51, the control device 14 determines whether or not a response signal 22 has been received. When the response signal 22 has been received, the process proceeds to step S52. When no response signal 22 is received, the process is terminated.

At step S52, the control device 14 synchronizes the reception clock with the transmission clock based on the information of the clock bit field 32.

At step S53, the control device 14 determines whether or not the received response signal 22 is the first data signal 28. If the received response signal 22 is the first data signal 28, the process goes to step S54. If the received response signal 22 is not the first data signal 28, the process proceeds to step S55.

At step S54, the control device 14 acquires information from the data bits 36 of the first data signal 28.

At step S55 after a negative decision at step S53, the control device 14 determines whether or not the received response signal 22 is the second data signal 30. When the received response signal 22 is the second data signal 30, the process goes to step S56. When the received response signal 22 is not the second data signal 30, the process is terminated.

At step S56, the control device 14 acquires information from the data bit field 36 of the second data signal 30.

At step S57, the control device 14 compares the information of the data bit field 36 of the first data signal 28 acquired at step S54 with the information of the data bit field 36 of the second data signal 30 acquired at step S56.

At step S58, the control device 14 determines whether or not the information of the data bit field 36 of the first data signal 28 coincides with the information of the data bit field 36 of the second data signal 30. When the two pieces of information are identical, the process is terminated. When the two pieces of information do not coincide, the process goes to step S59.

At step S59, the control device 14 discards the information of the data bit field 36 of the first data signal 28 acquired at step S54 and the information of the data bit field 36 of the second data signal 30 acquired at step S56, and terminates the process.

[Operation and Effect]

In the present embodiment, the control device 14 determines whether the information of the data bit field 36 of the first data signal 28 and the information of the data bit field 36 of the second data signal 30 coincide with each other. With this configuration, even if the first data signal 28 and the second data signal 30 have no parity bit 38, it is possible to determine whether or not there is an error in the data bit field 36 of the first data signal 28 or the data bit field 36 of the second data signal 30. Therefore, the amount of data per frame can be reduced, and hence the processing speed of the communication system 10 can be enhanced.

Still, the first data signal 28 and the second data signal 30 may have a parity bit 38. In this case, even if an error event that cannot be detected by using the parity bit 38 occurs, the error event can be detected by mutual comparison between the first data signal 28 and the second data signal 30, so that error detection can be improved, which contributes to the improvement in communication reliability.

Fourth Embodiment

In this embodiment, the second data signal 30 has a data bit field 36, and the data bit field 36 carries information on the rotational position of the motor 12. The control device 14 acquires information from the data bit field 36 of the second data signal 30 if the first data signal 28 contains an error.

[Response Signal Reception Process]

FIG. 13 and FIG. 14 are flowcharts showing a processing flow of receiving a response signal 22 performed in the control device 14. The reception process of a response signal 22 is repeated at predetermined time intervals.

At step S61, the control device 14 determines whether or not a response signal 22 has been received. When the response signal 22 has been received, the process proceeds to step S62. When no response signal 22 is received, the process is terminated.

At step S62, the control device 14 synchronizes the reception clock with the transmission clock based on the information of the clock bit field 32.

At step S63, the control device 14 determines whether or not the received response signal 22 is the first data signal 28. When the received response signal 22 is the first data signal 28, the process goes to step S64. When the received response signal 22 is not the first data signal 28, the process proceeds to step S70.

At step S64, the control device 14 acquires information from the data bit field 36 of the first data signal 28. The control device 14 controls the motor 12 based on the information of the data bit field 36.

At step S65, the control device 14 checks the occurrence of error in the first data signal 28 based on the number of "1"s included in the first data signal 28 inclusive of the parity bit 38.

At step S66, the control device 14 determines whether the first data signal 28 includes an error. If there is an error in the first data signal 28, the process goes to step S67. If no error is included in the first data signal 28, the process is terminated.

At step S67, the control device 14 discards the information of the data bit field 36 acquired at step S64.

At step S68, the control device 14 determines whether or not the preceding response signal 22 was successfully received. When the preceding response signal 22 was received successfully, the process goes to step S69. When the preceding response signal 22 has not been received successfully, the process is ended. For example, in a case where the second data signal 30 is transmitted twice in one transmission cycle of the first data signal 28 and when the control device 14 receives the first data signal 28, the preceding response signal 22 refers to the first data signal 28 and the first and second ones of the second data signals 30 that were transmitted in the previous transmission cycle. Successful reception of a response signal 22 means that the control device was able to receive at least one of the first data signal 28 and the first and second ones of the second data signals 30 while at least one of the received first data signal 28 and the first and second ones of the received second data signals 30 is free from errors.

At step S69, the control device 14 acquires information included in the data bit field of the signal that has been successfully received latest. For example, in the case where the first data signal 28 and the two second data signals 30 were transmitted in the previous transmission cycle, and when the first data signal 28 and the first one of the second data signals 30 were successfully received while the second one of the second data signals 30 was not successfully received, the signal that has been successfully received latest refers to the first one of the second data signals 30.

At step S70 after a negative decision at step S63, the control device 14 determines whether or not the received response signal 22 is the second data signal 30. When the received response signal 22 is the second data signal 30, the process proceeds to step S71. When the received signal is not the second data signal 30, the process is terminated.

At step S71, the control device 14 acquires information from the data bit field 36 of the second data signal 30. The control device 14 controls the motor 12 based on the information of the data bit field 36.

At step S72, the control device 14 checks the occurrence of error in the second data signal 30 based on the number of "1"s included in the second data signal 30 inclusive of the parity bit 38.

At step S73, the control device 14 determines whether the second data signal 30 includes an error. When there is an error in the second data signal 30, the process goes to step S74. When no error is included in the second data signal 30, the process is terminated.

At step S74, the control device 14 discards the information of the data bit field 36 acquired at step S71, and ends the process.

[Motor Control by Control Device]

When having received the first data signal 28 successfully, the control device 14 controls the motor 12 based on the information included in the data bit field 36 of the first data signal 28. When failing to receive the first data signal 28 successfully, the control device 14 controls the motor 12 based on the information of the data bit field 36 of a signal that has been successfully received latest among the first data signal 28 and the second data signals 30 received in the previous transmission cycle. Here, the cases where the control device 14 fails to receive the first data signal 28 successfully include a case where the control device fails to receive the first data signal 28 and a case where the received first data signal 28 contains an error.

[Operation and Effect]

This embodiment is configured such that when the control device fails to receive the first data signal 28 or when the received first data signal 28 includes error, the control device 14 controls the motor 12 based on the information of the data bit field 36 of a signal that has been successfully received latest among the first data signal 28 and the second data signals 30 received in the previous transmission cycle. With this configuration, even when failing to receive the first data signal 28 successfully, the control device 14 can continue to control the motor 12.

[Modification 1]

In the first to fourth embodiments, the first data signal 28 and the second data signal 30 have the clock bit field 32.

In contrast, the data bit field 36 may be transmission-encoded without having the clock bit field 32. Example of transmission encoding include 4B5B encoding, 8B10B encoding, Manchester encoding and others. The data bit field 36 after transmission-encoding must include data bits of "0" and "1". The control device 14 can synchronize the reception clock of the control device 14 with the transmission clock of the encoder 16 by monitoring the edge of a transition from "0" to "1" or "1" to "0" in the signal in the data bit field 36.

The control device 14 may synchronize the reception clock of the control device 14 with the transmission clock of the encoder 16 by using both the clock bit field 32 and the transmission encoded data bit field 36.

[Modification 2]

In the first to fourth embodiments, one control device 14 and one encoder 16 are connected by one communication line 18.

In contrast, a plurality of encoders 16 may be connected to one control device 14. In that case, one communication line 18 is provided for each encoder 16. Further, one encoder 16 may be connected to a plurality of control devices 14. In that case, one communication line 18 is provided for each control device 14.

[Modification 3]

In the first to fourth embodiments, one control device 14 and one encoder 16 are connected by one communication line 18.

In contrast, one control device 14 and one encoder 16 may be connected by a plurality of communication lines 18. For example, the control device 14 and the encoder 16 may be connected by two communication lines 18 in such a manner that the first data signal 28 and the second data signal 30 having the clock bit field 32 and no data bit field 36 are transmitted through one of the communication lines 18 while the first data signal 28 and the second data signal 30 having the data bit field 36 and no clock bit field 32 are transmitted through the other communication line 18.

Alternatively, the first data signal 28 and the second data signal 30 having the same information may be supplied to each of the plurality of communication lines 18.

Further, data of the first data signal 28 and the second data signal 30 may be divided, and divided data is transmitted through respective communication lines 18.

[Modification 4]

Though the communication system 10 according to the first to fourth embodiments uses single ended transmission, the communication system 10 may use differential transmission. In that case, the control device 14 and the encoder 16 need to be connected by two communication lines 18.

[Modification 5]

In the first to fourth embodiments, the exchange of the first data signal 28 and the exchange of the second data signal 30 between the control device 14 and the encoder 16 are performed based on the same protocol. Specifically, after the encoder 16 receives the first data request signal 24 or the second data request signal 26 transmitted as a request signal 20 from the control device 14, the encoder 16 transmits the first data signal 28 or the second data signal 30 as a response signal 22.

In contrast, a configuration may be provided in which the control device 14 transmits only the first data request signal 24 while the encoder 16 transmits the first data signal 28 after reception of the first data request signal 24 and then transmits the second data signal 30 at a predetermined timing.

[Modification 6]

Though the first to fourth embodiments have been described as to the communication system 10 for exchanging signals between the control device 14 and the encoder 16, the communication system 10 is not limited to this. The communication system 10 may also exchange signals between other devices.

Technical Ideas Obtained from the Embodiment

Technical ideas that can be grasped from the above embodiment will be described below.

The invention resides in the communication system (10) configured to perform serial communication between the transmitting device (16) and the receiving device (14), in which the transmitting device is configured to transmit, to the receiving device, a first data signal (28) including at least information on a transmission clock in one frame, and transmit, to the receiving device, a second data signal (30) including at least information on the transmission clock in one frame, during a time period from transmission of the first data signal until transmission of the first data signal in the next transmission cycle, and the receiving device is configured to receive the first data signal and the second data signal transmitted from the transmitting device, and synchronize a reception clock thereof with the transmission clock based on the information on the transmission clock of the first data signal and the information on the transmission clock of the second data signal. As a result, the reception clock can be synchronized with the transmission clock before the phase difference between the transmission clock and the reception clock becomes large, so that the amount of information regarding the transmission clocks in the first data signal and the second data signal can be reduced.

The above communication system may be configured such that the transmitting device transmits the second data signal to the receiving device if the period with which the first data signal is transmitted is equal to or longer than a predetermined time length, whereas the transmitting device does not transmit the second data signal to the receiving device if the period with which the first data signal is transmitted is shorter than the predetermined time length. In the configuration, when the transmission period of the first data signal is short, the second data signal is not transmitted. As a result, the transmission period of the first data signal can be shortened, so that it is possible to increase the transmission rate.

The above communication system may be configured such that the transmitting device transmits the second data signal a greater number of times during the time period from transmission of the first data signal until transmission of the first data signal in the next transmission cycle, as the period with which the first data signal is transmitted to the receiving device becomes longer. This makes it possible to synchronize the reception clock of the control device with the transmission clock of the encoder even if the transmission period of the first data signal is long.

In the above communication system, the first data signal and the second data signal each may have an identification bit field (34) configured to identify itself. This enables the receiving device to identify whether the received signal is the first data signal or the second data signal by monitoring the identification bit field.

The above communication system may be configured such that the first data signal and the second data signal each have a data bit field (36), the information of the data bit field is information that is used for a predetermined process in the receiving device, the data bit field of the first data signal and the data bit field of the second data signal have the same information; and the receiving device performs the predetermined process using the information of the data bit field of the second data signal if the receiving device fails to successfully receive the first data signal. This configuration makes it possible to secure signal redundancy, thereby resulting in improved reliability of the communication system.

The above communication system may be configured such that the first data signal and the second data signal each have a data bit field, the information of the data bit field is information that is used for a predetermined process in the receiving device, the data bit field of the first data signal and the data bit field of the second data signal have the same information, and the receiving device compares the information of the data bit field of the first data signal with the information of the data bit field of the second data signal to thereby determine whether or not the information of the data bit field of the first data signal coincides with the information of the data bit field of the second data signal. This configuration makes it unnecessary to provide an error detection code such as a parity bit (38) in the first data signal and the second data signal, so that it is possible to reduce the data volume of the first data signal and the second data signal.

The invention resides in the transmitting device (16) for performing serial communication with a receiving device (14). The transmitting device is configured to transmit, to the receiving device, a first data signal (28) including at least information on a transmission clock in one frame, and transmit, to the receiving device, a second data signal (30) including at least information on the transmission clock in one frame, during a time period from transmission of the first data signal until transmission of the first data signal in the next transmission cycle. As a result, the reception clock can be synchronized with the transmission clock before the phase difference between the transmission clock and the reception clock becomes large, so that the amount of information regarding the transmission clocks in the first data signal and the second data signal can be reduced.

The above transmitting device may be configured to transmit the second data signal to the receiving device if the period with which the first data signal is transmitted is equal to or longer than a predetermined time length, and configured not to transmit the second data signal to the receiving device if the period with which the first data signal is transmitted is shorter than the predetermined time length. With this configuration, when the transmission period of the first data signal is short, the second data signal is not transmitted. Thus, the transmission period of the first data signal can be shortened, so that it is possible to increase the transmission rate.

The above transmitting device may be configured to transmit the second data signal a greater number of times during the time period from transmission of the first data signal until transmission of the first data signal in the next transmission cycle, as the period with which the first data signal is transmitted to the receiving device becomes longer. This makes it possible to synchronize the reception clock of the control device with the transmission clock of the encoder even if the transmission period of the first data signal is long.

In the above transmitting device, the first data signal and the second data signal each may have an identification bit field (34) configured to identify itself. This enables the control device to identify whether the received signal is the first data signal or the second data signal by monitoring the identification bit field.

The invention resides in the receiving device (14) for performing serial communication with a transmitting device (16). The receiving device is configured to receive a first data signal (28) transmitted from the transmitting device, the first data signal including at least information on a transmission clock in one frame, and receive a second data signal (30) transmitted from the transmitting device, during the time period from transmission of the first data signal until transmission of the first data signal in the next transmission cycle, the second data signal including at least information on the transmission clock in one frame. The receiving device is further configured to synchronize a reception clock thereof with the transmission clock based on the information on the transmission clock of the first data signal and the information on the transmission clock of the second data signal. As a result, the reception clock can be synchronized with the transmission clock before the phase difference between the transmission clock and the reception clock becomes large, so that the amount of information regarding the transmission clocks in the first data signal and the second data signal can be reduced.

In the above receiving device, the first data signal and the second data signal each may have an identification bit field (34) configured to identify itself. This enables the receiving device to identify whether the received signal is the first data signal or the second data signal by monitoring the identification bit field.

The invention resides in a communication method for performing serial communication between a transmitting device (16) and a receiving device (14). The method includes the steps of, with the transmitting device, transmitting, to the receiving device, a first data signal (28) including at least information on a transmission clock in one frame, and transmitting, to the receiving device, a second data signal (30) including at least information on the transmission clock in one frame, during the time period from transmission of the first data signal until transmission of the first data signal in the next transmission cycle, and with the receiving device, receiving the first data signal and the second data signal transmitted from the transmitting device, and synchronizing a reception clock thereof with the transmission clock based on the information on the transmission clock of the first data signal and the information on the transmission clock of the second data signal. As a result, the reception clock can be synchronized with the transmission clock before the phase difference between the transmission clock and the reception clock becomes large, so that the amount of information regarding the transmission clocks in the first data signal and the second data signal can be reduced.

The invention resides in a signal transmitting method in a transmitting device (16) performing serial communication with a receiving device (14), including the step of: transmitting, to the receiving device, a first data signal (28) including at least information on a transmission clock in one frame, and transmitting, to the receiving device, a second data signal (30) including at least information on the transmission clock in one frame, during the time period from transmission of the first data signal until transmission of the first data signal in the next transmission cycle. As a result, the reception clock can be synchronized with the transmission clock before the phase difference between the transmission clock and the reception clock becomes large, so that the amount of information regarding the transmission clocks in the first data signal and the second data signal can be reduced.

The invention resides in a signal receiving method in a receiving device (14) performing serial communication with a transmitting device (16), including the steps of: receiving a first data signal (28) transmitted from the transmitting device, the first data signal including at least information on a transmission clock in one frame, and receiving a second data signal (30) transmitted from the transmitting device, during the time period from transmission of the first data signal until transmission of the first data signal in the next transmission cycle, the second data signal including at least information on the transmission clock in one frame; and synchronizing a reception clock thereof with the transmission clock based on the information on the transmission clock of the first data signal and the information on the transmission clock of the second data signal. As a result, the reception clock can be synchronized with the transmission clock before the phase difference between the transmission clock and the reception clock becomes large, so that the amount of information regarding the transmission clocks in the first data signal and the second data signal can be reduced.

The present invention is not particularly limited to the embodiment described above, and various modifications are possible without departing from the essence and gist of the present invention.

What is claimed is:

1. A communication system configured to perform serial communication between a transmitting device and a receiving device, wherein:
the transmitting device is configured to transmit, to the receiving device, a first data signal including at least information on a transmission clock in one frame, and transmit, to the receiving device, a second data signal including at least information on the transmission clock in one frame, during a time period from transmission of the first data signal until transmission of the first data signal in a next transmission cycle; and
the receiving device is configured to receive the first data signal and the second data signal transmitted from the transmitting device, and synchronize a reception clock thereof with the transmission clock based on the information on the transmission clock of the first data signal and the information on the transmission clock of the second data signal, wherein the transmitting device transmits the second data signal to the receiving device if a period with which the first data signal is transmitted is equal to or longer than a predetermined time length, whereas the transmitting device does not transmit the second data signal to the receiving device if the period with which the first data signal is transmitted is shorter than the predetermined time length.

2. The communication system according to claim 1, wherein the transmitting device is configured to transmit the second data signal a greater number of times during the time period from transmission of the first data signal until transmission of the first data signal in the next transmission cycle, as a period with which the first data signal is transmitted to the receiving device becomes longer.

3. The communication system according to claim 1, wherein the first data signal and the second data signal each have an identification bit field configured to identify itself.

4. The communication system according to claim 1, wherein:
the first data signal and the second data signal each have a data bit field;
information of the data bit field is information that is used for a predetermined process in the receiving device;
the data bit field of the first data signal and the data bit field of the second data signal have identical information; and
the receiving device performs the predetermined process using the information of the data bit field of the second data signal if the receiving device fails to successfully receive the first data signal.

5. The communication system according to claim 1, wherein:
the first data signal and the second data signal each have a data bit field;
information of the data bit field is information that is used for a predetermined process in the receiving device;
the data bit field of the first data signal and the data bit field of the second data signal have identical information; and
the receiving device is configured to compare the information of the data bit field of the first data signal with the information of the data bit field of the second data signal to thereby determine whether or not the information of the data bit field of the first data signal coincides with the information of the data bit field of the second data signal.

6. A transmitting device configured to perform serial communication with a receiving device, wherein the transmitting device is configured to transmit, to the receiving device, a first data signal including at least information on a transmission clock in one frame, and transmit, to the receiving device, a second data signal including at least information on the transmission clock in one frame, during a time period from transmission of the first data signal until transmission of the first data signal in a next transmission cycle, wherein the transmitting device transmits the second data signal to the receiving device if a period with which the first data signal is transmitted is equal to or longer than a predetermined time length, whereas the transmitting device does not transmit the second data signal to the receiving device if the period with which the first data signal is transmitted is shorter than the predetermined time length.

7. The transmitting device according to claim 6, wherein the transmitting device is configured to transmit the second data signal a greater number of times during the time period from transmission of the first data signal until transmission of the first data signal in the next transmission cycle, as a period with which the first data signal is transmitted to the receiving device becomes longer.

8. The transmitting device according to claim 6, wherein the first data signal and the second data signal each have an identification bit field configured to identify itself.

* * * * *